United States Patent Office 3,372,555
Patented Mar. 12, 1968

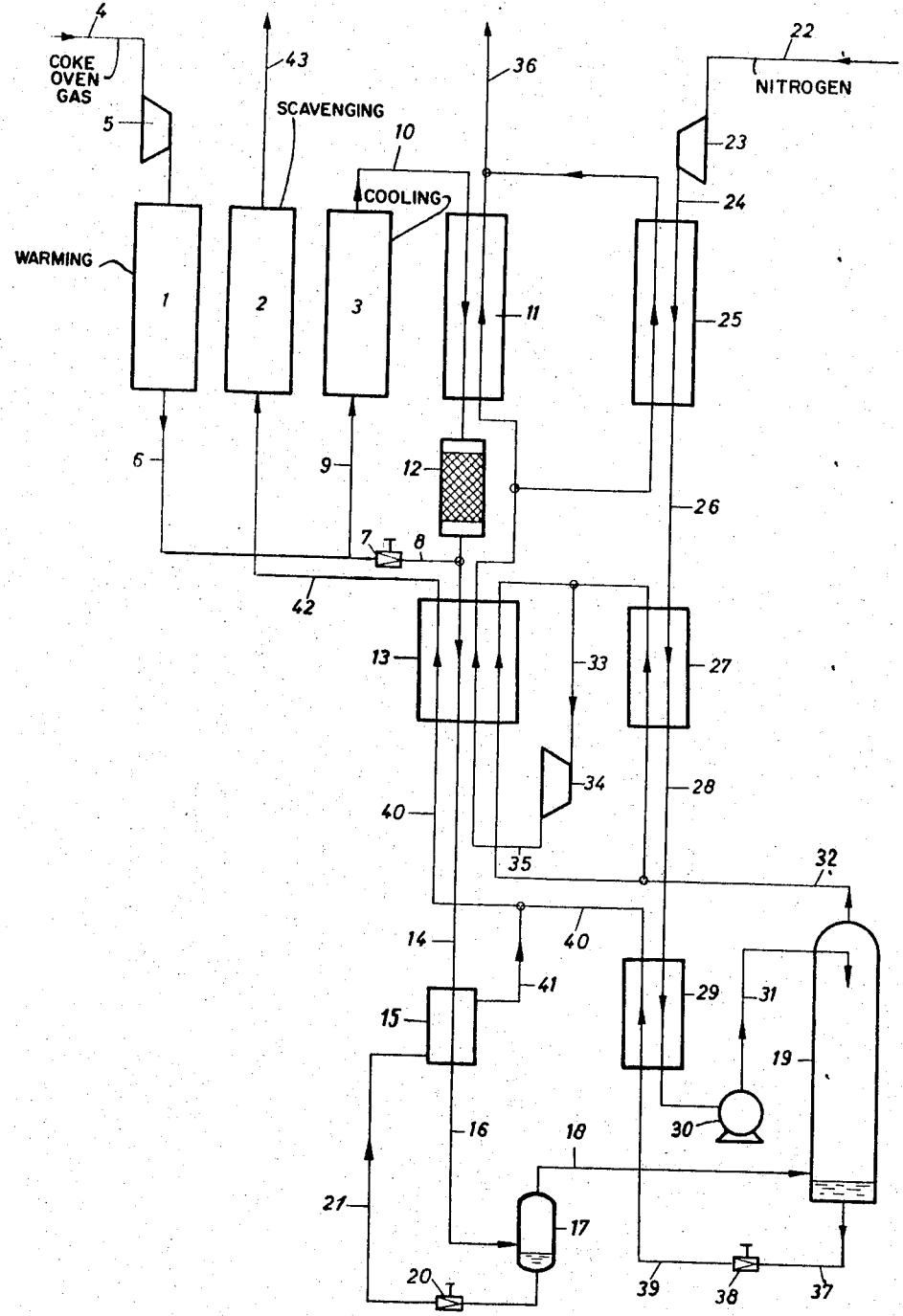

3,372,555
PROCESS AND APPARATUS FOR IMPURITY REMOVAL FROM HYDROGEN-CONTAINING GASES
Rudolf Becker, Munich-Solln, Germany, assignor to Linde Aktiengesellschaft, Wiesbaden, Germany
Filed Aug. 14, 1964, Ser. No. 389,708
Claims priority, application Germany, Aug. 21, 1963, G 38,515
10 Claims. (Cl. 62—13)

The present invention relates to a process and apparatus for the fractionation of hydrogen-containing gases. More particularly, it relates to a process and apparatus for the fractionation of hydrogen-containing gases in a regenerator installation.

The process and apparatus of the present invention are particularly concerned with the fractionation of hydrogen-containing gases by pressure and low temperature in an installation consisting of at least three cyclically interchangeable regenerators, each of which passes sequentially through a warming, a scavenging and a cooling period, where the hydrogen-containing gas in the warming period of one regenerator is separated into two fractions, one of which, a gaseous fraction, being divided into two currents, and one of which is passed through a regenerator which is in the cooling period and is then recombined with the other current.

The use of cyclically interchangeable regenerators in gas fractionation systems is well known in the art (cf. Linde Reports from Technology and Science, No. 3, 1958). The prior art shows, for example, a regenerator in a so-called warming period traversed by a gas to be cooled while the regenerator is warmed. In another period, known as the cooling period, the regenerator is again cooled by a gas to be warmed. The cooling which a gaseous mixture experiences during the warming period of a regenerator is generally used to separate condensable components from the gaseous mixture, the condensates depositing in the regenerator being later removed during a scavenging period by means of a residual or washing gas.

It has also been shown in the prior art that a gaseous current coming from a regenerator in its warming period can be divided into two partial currents, one of which is sent through a regenerator in its cooling period to be warmed thereby (German Patent No. 1,046,640 and 1,143,526). In this prior process the warming of the separated partial current in a second regenerator serves the purpose of bringing the gaseous mixture to the proper temperature for subsequent expansion in an expansion turbine, after which the gases are delivered to a low temperature installation.

When, for example, in the fractionation of hydrogen-containing gases the hydrogen is to be used for ammonia synthesis, or other processes requiring the use of pure hydrogen in order to prevent poisoning of catalysts it is then customary to subject the hydrogen from the regenerator and consisting mainly of hydrogen, to a washing with nitrogen to remove the remaining impurities. This washing with nitrogen is not the object of the present invention and hence will not be described in further detail since its object and procedure are well known in the art.

The present invention has for its primary object the fractionation of a hydrogen-containing gas in a regenerator installation to remove the undesired gaseous components thereof and to render the process more efficient and less expensive by improving the energy balance of the regenerator system.

This problem is solved according to the present invention by cooling the hydrogen-containing gas in a regenerator during its period of warming to a temperature only sufficiently low to effect complete separation of the components thereof which condense into the solid state, a portion of the remaining gaseous fraction being warmed in a regenerator in the cooling period, cooled by heat exchange, combined with the second portion of the gaseous fraction, further cooled during which additional condensates may form and then subjected to a washing with nitrogen.

The process of the present invention is suitable for all kinds of hydrogen-containing gaseous mixtures, but especially for the fractionation of coke oven gases, which contain hydrogen in substantial amounts together with considerable amounts of methane and carbon dioxide, carbon monoxide, nitrogen and water vapor. After removing the ammonia and other impurities from the gaseous mixture leaving the coke oven, the resulting gas is cooled with water and is then conducted to a regenerator in the warming period where it is cooled sufficiently to cause the carbon dioxide and all other higher boiling components to separate. This part of the process of the present invention requires that the cooling of the gaseous mixture in this regenerator must not be continued beyond a few degrees above the dew point of methane under the existing pressure conditions.

The crude hydrogen which has been freed from carbon dioxide and all higher boiling components is divided into two parallel currents, one of which serves, according to one phase of the present invention, to equalize the heat balance of the regenerator system. This is accomplished by passing this partial current through a regenerator which has been cleansed during the previous scavenging period by passing residual gases therethrough, thereby warming said partial current. The amount of this diverted partial current of gas should be such that the regenerator in its cooling period will be cooled by such partial current down to a temperature only low enough to separate only the carbon dioxide and higher boiling components from the initial gaseous mixture.

The partial current of warmed gas coming from the regenerator in the cooling period is practically free from carbon dioxide and higher boiling components because the regenerator has already been freed of these condensates. In another phase of the present invention the same partial current is then cooled in countercurrent heat exchange with residual gas and with a gaseous mixture of nitrogen and hydrogen, combined with the other partial current and then cooled in an economical manner down only to the dew point of methane.

Adsorbers can be advantageously interposed either directly behind the regenerator or behind the first countercurrent heat exchanger to remove the last traces of carbon dioxide and water vapor. Or, instead of adsorbers, reversible countercurrent condensers can be used. A further cooling of the crude hydrogen is finally accomplished by countercurrent heat exchange with previously liquefied methane whereby practically all of the methane will be removed from the crude hydrogen.

The removal of the last impurities from the gases is accomplished in any customary manner in a nitrogen washing column.

The above-described cooling of the crude hydrogen is economically effected in countercurrent reation to the nitrogen-hydrogen mixture from the nitrogen washing column in accordance with the process of the present invention, after a first heat exchange of the mixture with the crude hydrogen, by passing the mixture through an expansion turbine and the delivery of the cold thus produced to the crude hydrogen in a second heat exchanger.

The improved process of the present invention is schematically shown in the attached drawing wherein 1, 2 and 3 represent three cyclically reversible regenerators. In the switching period shown in the drawing regenerator 1 is in the warming period, regenerator 2 in the scavenging period and regenerator 3 is the cooling period. Conduit 4 delivers previously cleaned coke oven gas having the following composition:

|  | Vol. percent |
|---|---|
| Hydrogen | 55 |
| Nitrogen | 3 |
| Carbon monoxide | 6 |
| Oxygen | 0.5 |
| Methane | 28 |
| Ethylene | 2 |
| Ethane | 1 |
| $C_3$ and higher hydrocarbons | 1.5 |
| Carbon dioxide | 2 |
| Water vapor | 1 |

In the compressor 5 the crude gas is compressed to 5–15 atms. pressure and then passed through regenerator 1 in which it is cooled to between 115 and 130° K. The carbon dioxide and all of the higher boiling components of the coke oven gases are there condensed into the solid state. The gaseous mixture which leaves the regenerator through conduit 6 consists essentially of hydrogen together with some methane, carbon monoxide and nitrogen. A portion of the current of crude hydrogen which is sent through valve 7 and conduit 8 is diverted and sent through conduit 9 to regenerator 3 which was scavenged with residual gas during the preceding period. This partial current cools the regenerator 3 to a temperature sufficiently low to condense the carbon dioxide and higher boiling components in the next switching period. The gaseous partial current which has been warmed thereby leaves the regenerator 3 through conduit 10, passes through heat exchanger 11 and adsorber 12, and is then combined with the other partial current coming through conduit 8 and is further cooled in heat exchanger 13. In the heat exchanger 11, and especially in the heat exchanger 13, the crude hydrogen is cooled to the dew point of the methane. It is then delivered by conduit 14 to heat exchanger 15 in which any remaining methane will be liquefied and from which the liquefied methane is delivered via conduit 16 to the separator 17. From the separator 17 practically methane-free crude hydrogen is delivered by conduit 18 to the nitrogen wash column 19. The liquid methane in the separator 17 is passed through valve 20 and conduit 21 to heat exchanger 15 where it cools methane-containing crude hydrogen in countercurrent relation.

In the nitrogen wash column 19 the crude hydrogen is washed in a known manner with liquid nitrogen. The nitrogen is received from conduit 22, sent through compressor 23, then by conduit 24 through heat exchanger 25, afterwards by conduit 26 through heat exchanger 27 and finally by conduit 28 to heat exchanger 29 in which it is cooled and delivered by pump 30 via conduit 31 to column 19. A pure nitrogen-hydrogen mixture leaves the head of column 19 by conduit 32 and is divided into two partial currents to cool heat exchangers 13 and 27 to cool the methane-containing crude hydrogen from heat exchanger 11 in exchanger 13 and the nitrogen from heat exchanger 25 in exchanger 27. Both partial currents are recombined in conduit 33 and delivered to turbine 34 for expansion to 2.5 to 8 times its former volume. This cold nitrogen-hydrogen mixture which was expanded to do work is delivered by conduit 35 back to heat exchanger 13 whereby the methane-containing crude hydrogen is cooled, after which it is divided into two partial currents that are sent through heat exchangers 11 and 25 to cool in turn the methane-containing crude hydrogen in the exchanger 11 and the washing nitrogen in the exchanger 25, the nitrogen-hydrogen mixture being finally removed through conduit 36. The liquid in the sump of the nitrogen wash column 19 which consists mainly of nitrogen and carbon monoxide is passed through conduit 37, valve 38, conduit 39 and heat exchanger 29 for cooling a countercurrent of nitrogen. The product from the sump then passes through conduit 40 where it is added to the methane coming from heat exchanger 15 through conduit 41. This sump product and methane mixture then continues through conduit 40 to heat exchanger 13 in which it is again warmed and is delivered by conduit 42 to regenerator 2 in which it takes up the separated components such as carbon dioxide, water vapor, etc which were condensed during the previous switching period and thereby cleans the regenerator. The residual gas is finally removed by conduit 43.

What is claimed is:

1. A low temperature process for the fractionation of hydrogen-containing gases comprising substantial quantities of hydrogen, methane, and high boiling gases having melting points higher than the boiling point of methane, in an installation containing at least three cyclically reversible regenerators each of which passes successively through a warming, a scavenging and a cooling period whereby the hydrogen-containing gas in the warming period of the regenerator is fractionated into two fractions, one of which, the gaseous fraction, is divided into two partial currents, one of which is passed through a regenerator in the cooling period and is then recombined with the other partial current, which comprises cooling the hydrogen-containing gas in the regenerator in the warming period to a temperature higher than the dew point of methane but sufficiently low to congeal completely the high boiling components in their solid states, then warming the one partial current of the remaining gaseous fraction in the regenerator in the cooling period, recombining and further cooling the partial currents to liquefy and separate methane from the remaining gaseous components.

2. The process of claim 1, wherein the regenerator in the cooling period is cooled by the first partial current exactly to the temperature required for the separation of the solid components from the hydrogen-containing gas during the warming period.

3. The process of claim 1, wherein liquid fractions are eventually produced separately from the solid fraction.

4. A process as defined by claim 1 wherein said remaining gaseous components are washed with liquid nitrogen in a nitrogen washing column.

5. The process of claim 4, wherein the nitrogen-hydrogen mixture leaving the nitrogen washing column is expanded for the production of cold and is applied in countercurrent heat exchange to cool both the wash nitrogen and the partial current warmed in the regenerator in the cooling period.

6. The process of claim 4, wherein the regenerator in the cooling period is cooled by the first partial current exactly to the temperature required for the separation of the solid components from the hydrogen-containing gas during the warming period, and the nitrogen-hydrogen mixture leaving the nitrogen washing column is expanded for the production of cold and is applied in countercurrent heat exchange to cool both the wash nitrogen and the partial current warmed in the regenerator in the cooling period.

7. A process for the fractionation of hydrogen-containing gases by pressure and low temperature in an installation containing at least three cyclically reversible regenerators each of which passes successively through a warming, a scavenging and a cooling period whereby the hydrogen-containing gas in the warming peirod of the regenerator is fractionated into two fractions, one of which, the gaseous fraction, is divided into two partial currents, one of which is passed through a regenerator in the cooling period and is then recombined with the other partial current, which comprises cooling the hydrogen-containing gas in the regenerator in the warming period to a temperature only sufficiently low enough to separate completely the condensing components in their solid states, then warming the one partial current of the remaining gaseous fraction in the regenerator in the cooling period, cooling this partial current, recombining the two partial currents, further cooling the combined partial currents to permit additional condensates to separate while the remaining gaseous components are being washed with liquid nitrogen in a nitrogen washing column wherein the nitrogen-hydrogen mixture leaving the nitrogen washing column is expanded for the production of cold and is applied in countercurrent heat exchange to cool both the wash nitrogen and the partial current warmed in the regenerator in the cooling period.

8. The process of claim 7 wherein the regenerator in the cooling period is cooled by the first partial current exactly to the temperature required for the separation of the solid components from the hydrogen-containing gas during the warming period.

9. An apparatus comprising a phase separator for separating methane from raw hydrogen connected from the foot thereof to one side of a first heat exchanger, the other side of the said heat exchanger being connected with the gas space of said separator, said other side being also in serial communication with a second heat exchanger, an adsorber and a third heat exchanger, and an end of a regenerator, the head of said phase separator being also in communication with the foot of a nitrogen washing column, and conduit means for effecting the connection and communication.

10. The apparatus of claim 9, wherein a branched conduit leads successively from the head of the nitrogen washing column to another flow path of the second heat exchanger and to a fourth heat exchanger in parallel with said second heat exchanger, the second and fourth heat exchangers being on their outlet sides connected to the inlet of an expansion turbine, the outlet of said turbine being connected to a third flow path of the second heat exchanger, and the outlet side of this last flow path being connected to a branched conduit leading to another flow path of the third heat exchanger and to a fifth heat exchanger.

References Cited
UNITED STATES PATENTS

| | | | |
|---|---|---|---|
| 1,830,610 | 11/1931 | Linde | 62—20 |
| 2,727,587 | 12/1955 | Karwat | 62—18 X |
| 2,840,994 | 7/1958 | Lobo et al. | 62—18 X |
| 3,100,696 | 8/1963 | Becker | 62—13 |
| 2,071,763 | 2/1937 | Pollitzer | 62—12 |

FOREIGN PATENTS

| | | |
|---|---|---|
| 1,112,997 | 8/1961 | Germany. |
| 912,472 | 12/1963 | Great Britain. |
| 1,141,196 | 8/1957 | France. |

NORMAN YUDKOFF, *Primary Examiner.*

V. W. PRETKA, *Assistant Examiner.*